United States Patent

Belz et al.

[11] Patent Number: 6,135,688
[45] Date of Patent: Oct. 24, 2000

[54] UNDERCUT SELF-CUTTING DOWEL

[75] Inventors: Thomas Belz; Michael Werner, both of Munich, Germany

[73] Assignee: Hilti Aktiengesellschaft, Schaan, Liechtenstein

[21] Appl. No.: 09/418,336

[22] Filed: Oct. 14, 1999

[30] Foreign Application Priority Data

Oct. 22, 1998 [DE] Germany ............................ 198 48 704

[51] Int. Cl.$^7$ .............................. F16B 13/04; F16B 13/06
[52] U.S. Cl. ............................ 411/30; 411/54.1; 411/60.3
[58] Field of Search ................. 411/30, 31, 54, 411/54.1, 60.1, 60.2, 60.3

[56] References Cited

U.S. PATENT DOCUMENTS

| | | | |
|---|---|---|---|
| 4,984,945 | 1/1991 | Bergner | 411/30 |
| 5,609,453 | 3/1997 | Fischer | 411/54 |
| 5,772,372 | 6/1998 | Lins et al. | 411/60.2 |
| 5,988,964 | 11/1999 | Lins et al. | 411/30 |
| 6,012,887 | 1/2000 | Kaibach et al. | 411/30 |

*Primary Examiner*—Neill Wilson
*Attorney, Agent, or Firm*—Brown & Wood, LLP

[57] ABSTRACT

An undercut self-cutting dowel including a body (2) having a through-bore (13), a load application element (3) provided in a rear portion of the body (2), and a plurality of expansion tabs (4) separated by axial slots and formed in a front portion of the body (2), opposite the rear portion, with the expansion tabs (4) extending from a plastic hinge (5) to a free front end of the body (2), and with the body (2) having, in a region of the plastic hinge (5), a reduced, in comparison with the rear portion, outer diameter which results in formation of an annular shoulder (6) facing in a setting direction (s), with the outer diameter again increasing toward the free front end of the body (2); an expansion member (7) held in the through-bore (13) and projecting beyond the free front end of the body (2); and an expansion sleeve (8) surrounding sections of the expansion tabs (4) which adjoin the plastic hinge (5) and radially expandable at least in its front, in the setting direction, section, with a largest outer diameter (h) of the sleeve (8) being smaller than or equal to a largest diameter (a) of the body (2).

12 Claims, 1 Drawing Sheet

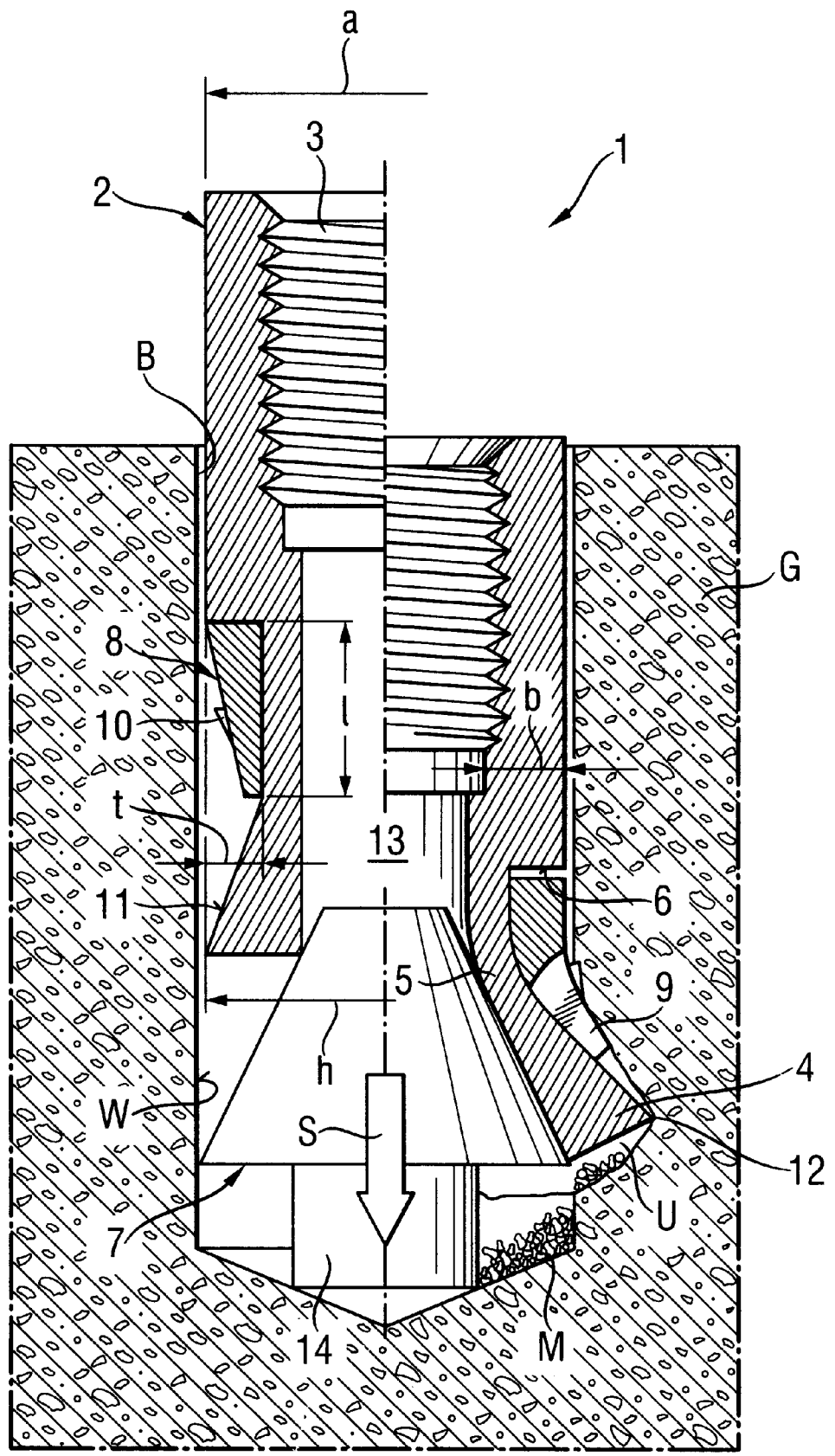

UNDERCUT SELF-CUTTING DOWEL

BACKGROUND OF THE INVENTION

1. Field of the Invention

The present invention relates to an undercut self-cutting dowel including a body having a through-bore, load application means provided in a rear portion of the body, and a plurality of expansion tabs separated by axial slots and formed in a front, in the setting direction, portion of the body, and further including an expansion member held in the through-bore, projecting beyond a front end of the body, and widening in the setting direction, with the expansion tabs expanding upon displacement of the body over the expansion member.

2. Description of the Prior Art

As attachment systems in which small distances between axes and edges should be retained, generally, fastening systems with formlocking anchoring of the fastening elements are used. In addition to a possibility to anchor a head bolt in a construction component by pouring, such distance-critical attachments can also be formed by using attachment systems with undercuts. With the use of one of such attachment systems, an undercut is formed in the vicinity of a bore bottom with a special tool. An anchor rod, with an expansion sleeve mounted thereon, is inserted in the bore, in which the undercut has been formed, and the expansion tabs of the expansion sleeve expand radially upon displacement of the sleeve over a head portion of the anchor rod, which widens in the setting direction. The expansion tabs which have their ends engaged in the undercut, form a formlocking connection with the structural component.

With another type of an attachment system with an undercut, a need in a special tool for forming the undercut is eliminated, as the undercut is formed automatically during the setting process, resulting in formation of a formlocking attachment at the end of the setting process. The undercut is formed by providing cutters at the free ends of the expansion tabs and which, upon rotation of the expansion sleeve, which is simultaneously driven over the head portion of the anchor rod with axial blows, mill the undercut in the bore, with the expansion tabs engaging in the so-formed undercut at the end of the setting process, forming a formlocking connection with the structural component. In addition to the attachment systems with an undercut self-cutting dowel with a rotatable sleeve, also known are attachment systems with which an undercut is formed without the rotation of the expansion sleeve, only by chiseling the cylindrical bore wall during the setting process.

The attachment or fastening system can be formed of an anchor rod with a head portion widening in the setting direction, and an expansion sleeve displaceable along the anchor rod. Another attachment system includes a body having a through-bore and an inner thread formed in the rear portion of the through-bore, and an outer cone which is held in the through-bore with its smallest diameter portion.

For formlocking anchoring of such "outcone-dowel", the body is driven over the outer cone, which is supported against the bottom of a bore formed in a structural component, by axial blows. The radially expanding expansion tabs chisel an undercut in the bore wall. Whereas with the attachment systems with an undercut which include an anchor rod, in case of a dynamic load or in case of a torn concrete, a certain secondary expansion takes place, the "outconedowel" does not provide for a secondary expansion when a tension load is applied to the inner thread. Without a secondary expansion, a formlocking anchoring system can fail even upon application of a relatively small load in case of a dynamic loading or in case of a torn concrete.

Accordingly, an object of the present invention is to provide an outcone-dowel anchoring system with an undercut capable of withstanding high loads even in case of dynamic loading and/or in case of a torn concrete.

SUMMARY OF THE INVENTION

This and other objects of the present invention, which will become apparent hereinafter, are achieved by providing an undercut self-cutting dowel including a body having a through-bore, load application means provided in a rear portion of the body, and a plurality of expansion tabs separated by axial slots and formed in a front portion of the body opposite the rear portion. The expansion tabs extend from a plastic hinge to a free front end of the body, and the body has in a region of the plastic hinge, a reduced, in comparison with the rear portion, outer diameter which results in formation of an annular shoulder facing in a setting direction, with the outer diameter again increasing toward the free front end of the body. The dowel further includes an expansion member held in the through-bore and projecting beyond the free front end of the body and widening in the setting direction. The expansion tabs expand radially upon displacement of the body over the expansion member. Still further, the dowel includes an expansion sleeve surrounding sections of the expansion tabs which adjoin the plastic hinge. The expansion sleeve is radially expandable at least at its front, in the setting directing, section and has a largest outer diameter which is smaller than or equal to a largest diameter of the body.

The provision of an expansion sleeve, which circumscribes the expansion tabs in the region of the plastic hinge, creates a precondition for a secondary expansion of the undercut self-cutting dowel under a tension load. During the setting process, the expansion sleeve is supported against an annular shoulder provided in the transition area between the body and the plastic hinge. Thereby, the expansion sleeve is driven in the setting direction together with the body. The at least partial radial expansion of the expansion sleeve insures that there are no obstacles to the radial expansion of the expansion tabs during the displacement of the body over the expansion member. Rather, the front portion of the expansion sleeve itself expands into the undercut. When a dynamic load is applied to the dowel or when a tension load is applied in an open fissure formed in the concrete, the body is being pulled rearward from the bore. This results in a relative displacement between the body and the expansion sleeve. The radially expanded expansion tabs, moving upward, radially expand the expansion sleeve which expansion is directly proportional to the relative displacement between the body and the expansion sleeve. As a result of secondary radial expansion of the expansion sleeve, the dowel becomes again fixed in the bore.

For improving the secondary expansion of the expansion sleeve into the undercut, which is formed by the expansion tabs during the setting process, advantageously, the expansion sleeve is provided with an outer diameter which decreases in the setting direction.

Advantageously, the outer diameter of a portion of the expansion sleeve, which adjoins the annular shoulder, corresponds to the outer diameter of the body at the annular shoulder.

Preferably, the axial length of the expansion sleeve amounts to from about 10% to about 90% of the axial extension of the expansion tabs. This length of the expansion sleeve insures that the expansion sleeve does not hinder chiseling of the bore wall with the expansion tabs and is reliably engaged in the formed undercut.

In order to facilitate radial expansion of the expansion sleeve, it is provided with at least one axial slot which extends, from the front, in the setting direction, end of the sleeve over from about 30% to 100% of the axial length of the expansion sleeve. For mounting purposes, the expansion sleeve is generally provided with an axial slot extending over the entire length of the expansion sleeve. This slot can remain open along its entire length or become closed by, e.g., spot welding. Other slots can be formed before mounting of the expansion sleeve.

During the setting process, the expansion sleeve is driven axially by the annular shoulder provided on the body. Advantageously, the largest wall thickness of a portion of the expansion sleeve adjoining the annular shoulder amounts from about 10% to about 70% of the largest wall thickness of the body.

The radial expansion capability of the expansion sleeve can be increased by forming the expansion sleeve of an easily deformable material, e.g., polyamide.

The secondary expansion of the undercut self-cutting dowel according to the present invention is based on the relative movement of the body with respect to the expansion sleeve which is fixed in the bore. To improve the axial fixation of the expansion sleeve, it is preferably provided, on its outer surface, with radial projections, the radial extent of which increases from the outer surface in a direction opposite to the setting direction. The radial projections are formed as barbs.

By forming the outer surface of the expansion tabs as a toroidal concave surface, an alignment of the cutting curve of the front ends of the expansion tabs with the tratrix of the following section of the expansion tabs is achieved. This also improves the secondary expansion of the expansion sleeve into the undercut.

The effectiveness of the removal of the bore wall material during chiseling of the bore wall is improved by providing cutters at the free ends of expansion tabs. The cutters can be formed, in per se known manner, by specific shaping of the front ends of the expansion tabs. Also, the cutters can be formed as hard metal inserts projecting from the front ends of the expansion tabs.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

Sing FIGURE shows a cross-sectional view of a front portion of an undercut self-cutting dowel according to the present invention, wherein the left half shows the initial position of the dowel, and the right half shows the dowel in its anchored condition.

DETAILED DESCRIPTION OF THE PREFERRED EMBODIMENT

An undercut self-cutting dowel 1 according to the present invention, a front portion of which is shown in the drawing, has a substantially cylindrical body 2 formed of metal, preferably of stainless steel, and having a through-bore 13. In the rear section of the bore 13, the body 2 is provided with an inner thread 3 which functions as load application means. The inner thread 3 is a standard thread. The inner diameter of the bore in the region of the inner thread 3 corresponds to the connection diameter of, e.g., a thread rod. The body 2 has a wall thickness the size of which is selected in accordance with the connection diameter of the thread rod, strength of the material the body is made of, and a contemplated load value. The body 2 has its largest outer diameter in the region of the inner thread 3. The largest diameter of the body 2 determines what diameter a bore for receiving the dowel 1, which is to be formed in a constructional component G, e.g., in concrete, would have.

At its front, in the setting direction S, portion, the body 2 has a plurality of expansion tabs 4 separated by axial slots. The expansion tabs 4 extend from a plastic hinge 5 to the free front end of the body 2. For forming the plastic hinge 5, the diameter of the body 2 is reduced in the region of the plastic hinge 5. The reduction of the diameter of the body 2 results in formation of an annular shoulder 6 facing in the setting direction 5. Starting from the annular shoulder 6, the expansion tabs 4 have a portion with a constant outer diameter, with the outer diameter of the expansion tabs 4 then increasing toward the free front end of the body 2. As result of the increase of the outer diameter of the expansion tabs 4, a substantially toroidal concave outer surface 11 is formed. The toroidal concave outer surface 11 insures, upon radial expansion of the expansion tabs 4, a best possible correspondence between the cutting curve and the tratrix. The radial expansion of the expansion tabs 4 takes place upon axial movement of the body 2 in the setting direction S over a conical expansion member 7 which is held in the bore 13 with its section having the smallest outer diameter. The expansion member 7 extends beyond the free front end of the body 2. Cutters 12 are provided at the free front end of the body 2. The cutters 12 can be formed, e.g., by a specific shaping of the front end of the body 2 and subsequent hardening or as cutter inserts formed of hard metal. As shown in the drawing, a cylindrical projection 14 adjoins the expansion member 7 at its largest diameter section. During the setting process, the projection 14 is supported against the bottom of the bore B and provides a free space for material M which is removed from the bore wall W during the setting process.

A portion of the expansion tabs 4, which adjoins the annular shoulder 6 is surrounded by an expansion sleeve 8. The expansion sleeve 8 has a largest outer diameter h which is smaller than or is equal to the outer diameter a of the body 2. As shown in the drawing, the expansion sleeve 8 is wedge-shaped in the axial direction, with the outer diameter h diminishing in the setting direction S. The length 1 of the expansion sleeve 8 amounts to from about 10% to about 90% of the length of the extension of the expansion tabs 4 from the shoulder 6 to the free front end of the body 2. The expansion sleeve 8 has its largest wall thickness t in its region adjoining the annular shoulder 6, with the thickness t being selected to correspond from about 10% to about 70% of the largest thickness of the body 2. Preferably, the wall thickness t of the expansion sleeve 8 corresponds to the width of the annular shoulder 6. The expansion sleeve 8 has at least one axial slot 9 which extends over at least 30% of its axial length 1. Radial projections 10 can be formed on the outer surface of the expansion sleeve 8. The radial projections 10 are barb-shaped, with their radial extent with respect to the outer surface of the expansion sleeve 8 increasing in a direction opposite to the setting direction.

The expansion sleeve 8 is usually formed of sheet metal, preferably, of stainless sheet steel. It also can be formed of an easily deformable material, e.g., polyamide.

The setting of the undercut self-cutting dowel 1 according to the present invention is effected by axially displacing the body 2 over the expansion member 7 supported against the bottom of the bore B formed in the constructional component G. The expansion tabs 4 expand radially upon the displacement of the body 2 relative to the expansion member 7. Upon radial expansion of the expansion tabs 4, the cutters 12, which are provided at the front free end of the body 2, chisel the material M from the bore wall W and form, as a result, an undercut U. The removed material accumulates at the bottom of the bore B. The expansion sleeve 8 is displaced by the annular shoulder 6. The front, reduced diameter section of the expansion sleeve 8 is pushed into the undercut U together with the expansion tabs 4. After the end of the setting process, the dowel 1 is in the position shown in the right part of the drawing. With a dynamic tension load or under tension, and with an open fissuer in the constructional component G, the body 2 would move in a direction opposite to the setting direction S, with the expansion tabs 4 moving against the expansion sleeve 8 wedged in the bore B and expanding the sleeve 8 even further. This would prevent further movement of the body 2 in the direction opposite to the setting direction.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. An undercut self-cutting dowel, comprising a body (2) having a through-bore (13), load application means (3) provided in a rear portion of the body (2), and a plurality of expansion tabs (4) separated by axial slots and formed in a front portion of the body (2) opposite the rear portion, the expansion tabs (4) extending form a plastic hinge (5) to a free front end of the body (2), and the body (2) having, in a region of the plastic hinge (5), a reduced, in comparison with the rear portion, outer diameter which results in formation of an annular shoulder (6) facing in a setting direction (S) with the outer diameter again increasing toward the free front end of the body (2); an expansion member (7) held in the through-bore (13) and projecting beyond the free front end of the body (2), the expansion member (7) widening in the setting direction (S), the expansion tabs (4) expanding radially upon displacement of the body (2) over the expansion member (7); and an expansion sleeve (8) surrounding sections of the expansion tabs (4) which adjoin the plastic hinge (5), the expansion sleeve (8) being radially expandable at least in a front, in the setting direction, section thereof and having a largest outer diameter (h) which is one of smaller than and equal to a largest diameter (a) of the body (2).

2. An undercut self-cutting dowel according to claim 1, wherein an outer diameter of the expansion sleeve (8) decreases in the setting direction (S).

3. An undercut self-cutting dowel according to claim 1, wherein the exspansion sleeve (8) has its largest outer diameter (h) in a sleeve portion adjoining the annular shoulder (6) with the largest outer diameter (h) of the expansion sleeve (8) corresponding to the outer diameter (a) of the body (2) in the region of the annular shoulder (6).

4. An undercut self-cutting dowel according to claim 1, wherein the expansion sleeve (8) has a length (1) which amounts to from about 10% to about 90% of an axial extension of the expansion tabs (4).

5. An undercut self-cutting dowel according to claim 1, wherein the expansion sleeve (8) has at least one axial slot (9) extending, in a setting direction (S) from a front end of the expansion sleeve (8), over from about 30% to about 100% of an axial length of the expansion sleeve (8).

6. An undercut self-cutting dowel according to claim 1, wherein a largest wall thickness of the expansion sleeve (8) amounts from about 10% to about 70% of a largest wall thickness (b) of the body (2).

7. An undercut self-cutting dowel according to claim 1, wherein the expansion sleeve is formed of an easily deformable material.

8. An undercut self-cutting dowel according to claim 1, wherein the expansion sleeve is formed of a polyamide.

9. An undercut self-cutting dowel according to claim 1, wherein an outer surface of the expansion sleeve (8) is provided with radial projections (10) a radial extent of which from the outer surface of the expansion sleeve (8) increases in a direction opposite to the setting direction.

10. An undercut self-cutting dowel according to claim 1, wherein the expansion tabs (4) have a toroidal concave outer surface (11).

11. An undercut self-cutting dowel according to claim 1, wherein cutters (12) are provided at the free front end of the body (2).

12. An undercut self-cutting dowel according to claim 1, wherein the load application means comprises an inner thread provided in a rear portion of the through-bore (13) corresponding to the rear portion of the body (2).

* * * * *